United States Patent
Jalbert

(10) Patent No.: US 8,876,946 B2
(45) Date of Patent: Nov. 4, 2014

(54) COMBINED FUEL STABILIZATION UNIT AND HEAT EXCHANGER

(75) Inventor: Peter L. Jalbert, Granby, CT (US)

(73) Assignee: Hamilton Sundstrand Corporation, Windsor Locks, CT (US)

(*) Notice: Subject to any disclaimer, the term of this patent is extended or adjusted under 35 U.S.C. 154(b) by 238 days.

(21) Appl. No.: 13/438,219

(22) Filed: Apr. 3, 2012

(65) Prior Publication Data

US 2013/0255489 A1  Oct. 3, 2013

(51) Int. Cl.
*B01D 53/22* (2006.01)
*B01D 19/00* (2006.01)

(52) U.S. Cl.
USPC ................ 95/46; 95/54; 96/6; 96/7

(58) Field of Classification Search
CPC .............. B01D 19/0031; B01D 53/22; B01D 2317/02; B01D 2317/04; B01D 2257/104; F02C 3/20; F02C 7/22
USPC ........ 95/45, 46, 54; 96/4, 6, 7, 9, 11; 165/138
See application file for complete search history.

(56) References Cited

U.S. PATENT DOCUMENTS

| | | | |
|---|---|---|---|
| 5,162,101 A * | 11/1992 | Cosentino et al. | 95/54 |
| 5,358,689 A * | 10/1994 | Jones et al. | 95/54 |
| 6,939,392 B2 * | 9/2005 | Huang et al. | 95/46 |
| 7,384,452 B2 * | 6/2008 | Sirman et al. | 95/54 |
| 7,431,818 B2 | 10/2008 | Cipollini | |
| 7,465,336 B2 | 12/2008 | McHugh | |
| 7,571,596 B2 | 8/2009 | Parsons | |
| 7,582,137 B2 | 9/2009 | Chen et al. | |
| 7,824,470 B2 | 11/2010 | Chiappetta et al. | |
| 2005/0211096 A1 | 9/2005 | Burlatsky et al. | |
| 2006/0263277 A1 * | 11/2006 | Tillman et al. | 422/188 |
| 2006/0278073 A1 | 12/2006 | McHugh | |
| 2007/0006591 A1 | 1/2007 | Spadaccini et al. | |
| 2007/0095206 A1 * | 5/2007 | Cordatos et al. | 95/54 |
| 2008/0098894 A1 * | 5/2008 | Sabatino et al. | 96/6 |
| 2010/0263348 A1 | 10/2010 | Gage | |
| 2010/0294128 A1 | 11/2010 | Schmidt et al. | |

* cited by examiner

*Primary Examiner* — Jason M Greene
(74) *Attorney, Agent, or Firm* — Carlson, Gaskey & Olds P.C.

(57) ABSTRACT

A conditioner for conditioning fuel passing therethrough includes a deoxygenator having a body in which oxygen is removed from the fuel, and a heat exchanger attaching directly to the body for moderating a temperature of the fuel.

18 Claims, 3 Drawing Sheets

COMBINED FUEL STABILIZATION UNIT AND HEAT EXCHANGER

BACKGROUND

The present invention relates to stabilizing fuel by deoxygenation, and more particularly to a heat exchanger fuel stabilization unit.

Fuel is often utilized in aircraft as a coolant for various aircraft systems. The presence of dissolved oxygen in hydrocarbon jet fuels may be objectionable because the oxygen supports oxidation reactions that yield undesirable by-products. Dissolution of air in jet fuel results in an approximately 70 ppm oxygen concentration. When aerated fuel is heated between 350 degrees F. (or 177 degrees C.) and 850 degrees F. (or 454 degrees C.), the oxygen initiates free radical reactions of the fuel resulting in deposits commonly referred to as "coke" or "coking". Coke may be detrimental to the fuel lines and may inhibit combustion. The formation of such deposits may impair the normal functioning of a fuel system, either with respect to an intended heat exchange function or the efficient injection of fuel.

Various conventional fuel deoxygenation techniques are currently utilized to deoxygenate fuel. Typically, lowering the oxygen concentration to 2 ppm is sufficient to minimize coking problems.

One conventional Fuel Stabilization Unit (FSU) utilized in aircraft removes oxygen from jet fuel by producing an oxygen pressure gradient across a membrane permeable to oxygen. The FSU includes a plurality of fuel plates sandwiched between permeable membranes and porous substrate plates disposed within a housing. Each fuel plate defines a portion of the fuel passage and the porous plate backed permeable membranes define the remaining portions of the fuel passages. The permeable membrane includes Teflon or other type of amorphous glassy polymer coating in contact with fuel within the fuel passages for preventing the bulk of liquid fuel from migrating through the permeable membrane and the porous plate.

The use of a plurality of similarly configured flat plates increases manufacturing efficiency and reduces overall cost. Further, the size and weight of the FSU is substantially reduced while increasing the capacity for removing dissolved oxygen from fuel. Moreover, the planar design is easily scalable compared to previous tubular designs.

SUMMARY

According to an embodiment disclosed herein a conditioner for conditioning fuel passing therethrough includes a deoxygenator having a body in which oxygen is removed from the fuel and a surface, and a heat exchanger attaching directly to the body and conforming to the surface for moderating a temperature of the fuel.

According to a further embodiment disclosed herein, a fuel system for an energy conversion device includes a deoxygenator having a body in which oxygen is removed from the fuel and a surface; a heat exchanger attaching directly to the body and conforming to the surface for moderating a temperature of the fuel; no upstream heat exchanger attaching to the heat exchanger attaching directly to the body; and, no downstream heat exchanger attaching directly to the heat exchanger attaching directly to the body.

According to an embodiment disclosed herein, a method for conditioning fuel in a fuel system includes the steps of providing a deoxygenator having a body in which oxygen is removed from the fuel and a surface; attaching a heat exchanger directly to the body and conforming to the surface for providing a first temperature of the fuel; not attaching an upstream heat exchanger to the heat exchanger attaching directly to the body; and, not attaching a downstream heat exchanger to the heat exchanger attaching directly to the body.

BRIEF DESCRIPTION OF THE DRAWINGS

The various features and advantages of this invention will become apparent to those skilled in the art from the following detailed description of the currently preferred embodiment. The drawings that accompany the detailed description can be briefly described as follows.

DETAILED DESCRIPTION

Figure 1:
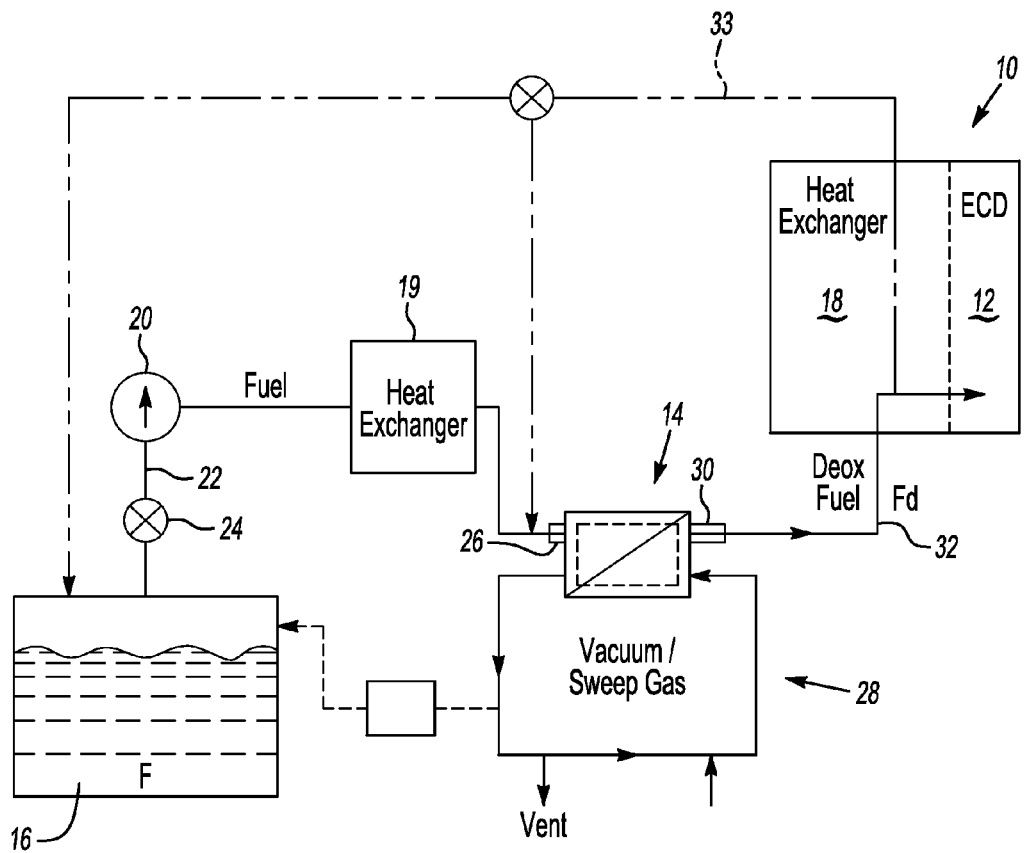
FIG. 1 is a schematic, prior art block diagram of an energy conversion device (ECD) and an associated fuel system employing a fuel deoxygenator.

FIG. 1 illustrates a general schematic view of a prior art fuel system 10 for an energy conversion device (ECD) 12. A plate-type deoxygenator system 14 receives liquid fuel F from a reservoir 16 such as a fuel tank. The fuel F is typically a hydrocarbon such as jet fuel. The ECD 12 may exist in a variety of forms in which the fuel, at some point prior to eventual use for processing, for combustion or for some form of energy release, acquires sufficient heat to support autoxidation reactions and coking if dissolved oxygen is present to any significant extent in the fuel.

One form of the ECD 12 is a gas turbine engine, and particularly such engines in high performance aircraft. Typically, the fuel also serves as a coolant for one or more subsystems in the aircraft and becomes heated as it is delivered to fuel injectors immediately prior to combustion.

A heat exchange section 18 represents a system through which the fuel passes in a heat exchange relationship. It should be understood that the heat exchange section 18 may be directly associated with the ECD 12 and/or distributed elsewhere in the larger system 10. The heat exchange system 18 may alternatively or additionally include a multiple of heat exchangers distributed throughout the system. For instance a heat exchange unit 19 may be distributed upstream of the deoxygenator system 14.

As generally understood, fuel F stored in the reservoir 16 normally contains an unacceptable level of dissolved oxygen therein, possibly at a saturation level as high as 70 ppm. A fuel pump 20 draws the fuel F from the reservoir 16. The fuel pump 20 communicates with the reservoir 16 via a fuel reservoir conduit 22 and a valve 24 to a fuel inlet 26 of the deoxygenator system 14. The pressure applied by the fuel pump 20 assists in circulating the fuel F through the deoxygenator system 14 and to other portions of the fuel system 10 including the upstream heat exchanger 19. As the fuel F passes through the deoxygenator system 14, oxygen is selectively removed into a sweep gas/vacuum system 28.

The deoxygenated fuel Fd flows from a fuel outlet 30 of the deoxygenation system 14 via a deoxygenated fuel conduit 32, to the heat exchange system 18 and to the ECD 12 such as the fuel injectors of a gas turbine engine (not shown). A portion of the deoxygenated fuel may be recirculated, as represented by recirculation conduit 33 to either the deoxygenation system 14 and/or the reservoir 16. It should be understood that although a particular component arrangement is disclosed in the illustrated embodiment, other arrangements will benefit from the instant invention.

Figure 2:
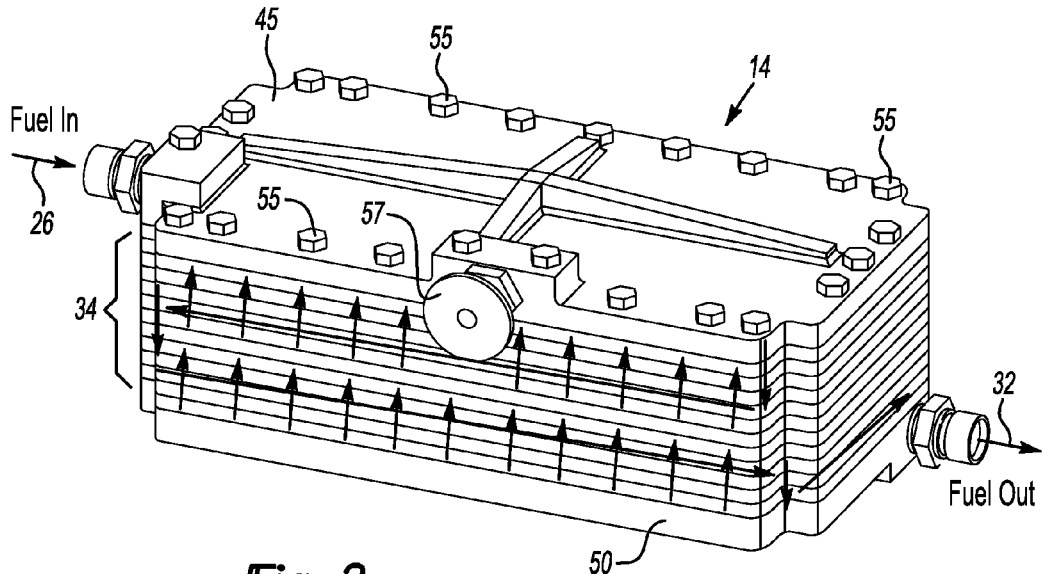
FIG. 2 is a schematic sectional view of a portion of the prior art deoxygenator system illustrating a single fuel plate and a single oxygen permeable membrane.

Referring to FIG. 2, the prior art deoxygenator system 14 can include a multiple of gas/fuel micro-channel assemblies 34 which may include an oxygen permeable membrane (not shown) between a fuel channel (not shown) and an oxygen receiving channel including either a vacuum or a sweep gas (not shown). It should be understood that the channels may be of various shapes and arrangements to provide a pressure differential, which maintains an oxygen concentration differential across the membrane to deoxygenate the fuel. The deoxygenator system 14 includes a top plate 45 and a bottom plate 50 that are connected via bolts or other connectors 55 to the gas/fuel micro-channel assemblies 34 to maintain the rigidity of the gas/fuel micro-channel assemblies 34. The top plate 45 includes a conduit 57 that connects to the sweep gas/vacuum system 28. Though the deoxygenator system 14 shown herein is of a plate type, one of ordinary skill in the art will recognize that other types of deoxygenator systems may benefit from the teachings herein.

Figure 3:
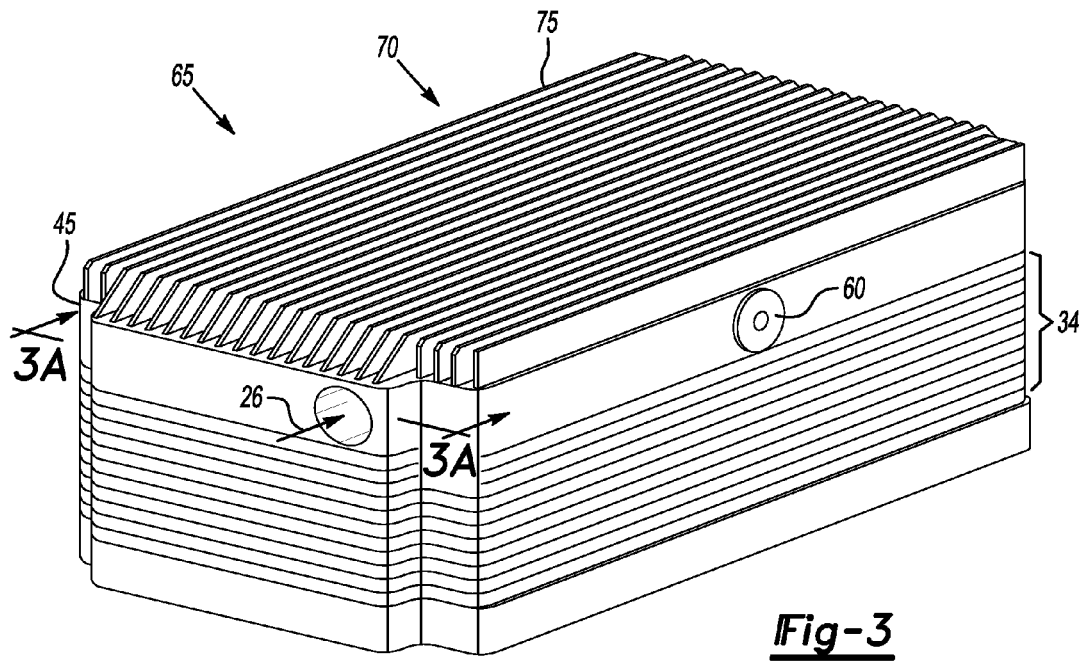
FIG. 3 is an schematic view of the deoxygenator system illustrating a multiple of fuel plates and oxygen permeable membranes in conjunction with a heat exchanger therefor.
Figure 3A:
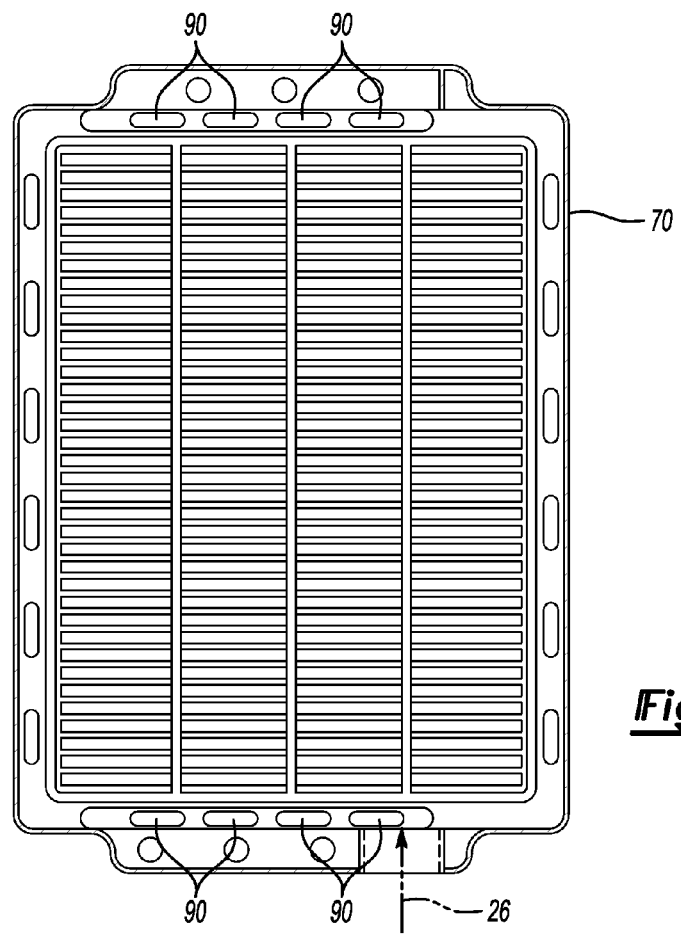
FIG. 3A is a cut-away schematic view of the deoxygenator system taken along the line 3A-3A of FIG. 3.

Referring now to FIGS. 3 and 3A, an embodiment of a novel deoxygenator/heat exchanger 65 is shown herein. The novel deoxygenator/heat exchanger 65 includes a heat exchanger 70 having a generally rectangular-shaped body that includes a plurality of fins 75 extending outwardly therefrom disposed atop the gas/fuel micro-channel assemblies 34 after the top plate 45 of the deoxygenation system 14 is removed. The heat exchanger 70 body conforms to a shape of the gas/fuel micro-channel assemblies 34. Referring to FIG. 3A, the fuel flows along path 80, which may be sinuous, within the heat exchanger 70 under the fins 75 before entering a manifold 85 and conduits 90 that feed the gas/fuel micro-channel assemblies 34 where oxygen is removed. Though one path 80 is shown, one of ordinary skill in the art will recognized that other shaped paths may be utilized. The path 80 may be bored into the heat exchanger 70 be within an open space and finned, or be distributed across the heat exchanger 70 in every other of a series of multiple plates (see FIG. 4) etc.

Fuel flowing from the fuel pump 20 flows into the fuel inlet 26 and along the sinuous path 80 and absorbs heat collected by the heat exchanger surface 65 to raise the temperature of the fuel, in one example, to about 180° F. This temperature assists in the removal of oxygen via the gas/fuel micro-channel assemblies 34 without significantly raising a probability of created coke. The fuel is then sent to the upstream heat exchanger 18 and/or the ECD. This deoxygenator/heat exchanger 65 is designed to extract heat from ambient. One of ordinary skill in the art will recognize that the heat exchanger surface 70 may be placed on any portion of the deoxygenator system 14 where fuel flows before entering the gas/fuel micro-channel assemblies 34.

Figure 4:
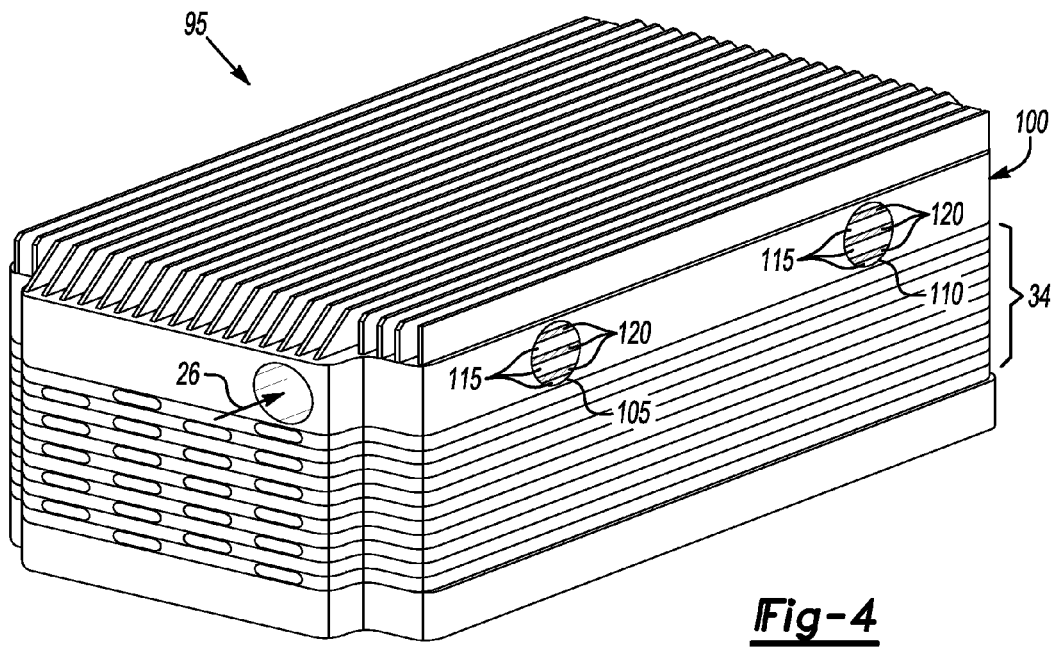
FIG. 4 is a schematic view of a deoxygenator system with a laminated heat exchanger; and, FIG. 5 a general schematic block diagram of an associated fuel system employing a fuel deoxygenator in accordance with the embodiments disclosed herein.

Referring to FIG. 4, another embodiment of a novel heat exchanger 95 for use with the gas/fuel micro-channel assemblies 34, or other oxygen removal module is shown. In this embodiment, more heat, or heat from a different source than ambient, may be required before entering the fuel micro-channel assemblies 34. In this example, top plate 45 is replaced with a heat exchanger body 100 that has an additional heat source, such as oil or heated air, input 105 and an output 110 through paths 115 that interact with path(s) 80 (see FIG. 3A) in plates 120 that carry fuel to transfer heat to the fuel in the plates 120. The air or oil may be distributed into input 105 that attaches to multiple paths through multiple plates 120 or otherwise interact with the path 80 to efficiently transfer heat to the fuel.

Figure 5:
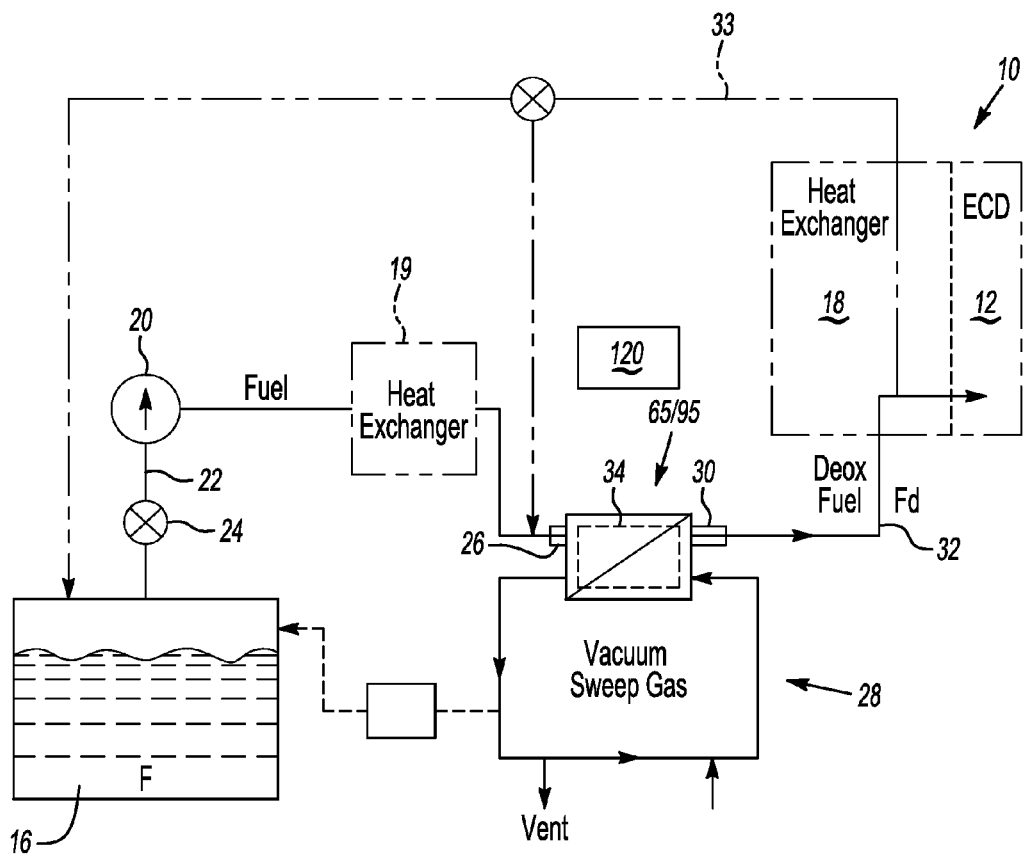

Referring now to FIG. 5 an embodiment of a fuel system 10 is shown. Many commercial airliners operate their fuel systems at about 250 degrees F. or 121 degrees C. to minimize coking. By attaching the heat exchangers 65/95 or the like to the deoxygenator system 14, several advantages accrue: the fuel F captures low grade heat from ambient via fins 75 to improve the efficiency of the deoxygenator system 65/95; the heat exchanger and the deoxygenator system 65/95 are one unit and space is recovered and the amount of connections are minimized, rigidity necessary to retain the gas/fuel micro-channel assemblies 34 is maintained; installation is simplified; and the size of the downstream heat exchanger 18 may be minimized or eliminated, particularly if the heat exchanger body 100 is utilized in the deoxygenator system 65/95.

The heat exchangers 65/95 may be placed near heat sources 120 such as an auxiliary power unit or the like to take advantage of waste heat emanating from the auxiliary power unit.

In military or other operations where higher temperature fuel is required, the requirement to minimize coking is minimized because more maintenance is generally performed in which coke is removed routinely. The heat exchangers 65/95 may be required to add much more heat to the fuel (e.g. up to 400 degrees F. or 204 degrees C. more heat) in conjunction with or instead of the heat exchangers 18 and 19.

Though a system for use with an ECD 12 such as a gas turbine engine (not shown) is described herein, one of ordinary skill in the art will recognize that the teachings herein are applicable to other ECDs.

The preceding description is exemplary rather than limiting in nature. Variations and modifications to the disclosed examples may become apparent to those skilled in the art that do not necessarily depart from the essence of this disclosure. Thus, the scope of legal protection given to this disclosure can only be determined by studying the following claims.

I claim:

1. A conditioner for conditioning fuel passing therethrough, said conditioner comprising:
a deoxygenator having a body in which oxygen is removed from said fuel, said body having a surface; and,
a heat exchanger attaching directly to said body and conforming to said surface for moderating a temperature of said fuel, said heat exchanger including a plurality of fins extending in a direction opposite said surface.

2. The conditioner of claim 1 wherein said heat exchanger provides structural rigidity to said body.

3. The conditioner of claim 1 wherein said body has a sinuous path in which said fuel passes therethrough.

4. The conditioner of claim 1 wherein said deoxygenator has a plurality of gas/fuel assemblies for removing oxygen therein.

5. The conditioner of claim 4 wherein said gas/fuel assemblies include micro-channels.

6. The conditioner of claim 1 wherein said heat exchanger is comprised of a series of plates.

7. The conditioner of claim 1 further comprising a heat source disposed near said heat exchanger attached to said body.

8. The conditioner of claim 1 wherein said heat exchanger adds heat to said fuel.

9. A fuel system for an energy conversion device comprising:
- a deoxygenator having a body in which oxygen is removed from fuel, said body having a surface;
- a heat exchanger attaching directly to said body and conforming to said surface for moderating a temperature of said fuel, said heat exchanger including a plurality of fins extending in a direction opposite said surface;
- no upstream heat exchanger attaching to said heat exchanger attaching directly to said body; and,
- no downstream heat exchanger attaching directly to said heat exchanger attaching directly to said body.

10. A method for conditioning fuel in a fuel system:
- providing a deoxygenator having a body in which oxygen is removed from said fuel and having a surface;
- attaching a heat exchanger directly to said body and conforming to said surface for providing a first temperature of said fuel, said heat exchanger including a plurality of fins extending in a direction opposite said surface;
- not attaching an upstream heat exchanger to said heat exchanger attaching directly to said body; and,
- not attaching a downstream heat exchanger to said heat exchanger attaching directly to said body.

11. The method of claim 10 further comprising:
establishing a flow of fluid through a path in the heat exchanger, the fluid interacting with a flow of fuel.

12. The method of claim 11 wherein the fluid is one of air and oil.

13. The method of claim 11 wherein the heat exchanger includes multiple paths provided between adjacent plates, and wherein a flow of fluid is established through each of the multiple paths in the heat exchanger.

14. The conditioner of claim 1 wherein said surface is a top surface of said conditioner.

15. The conditioner of claim 1 wherein said heat exchanger includes an input through path and an output through path, said input and output through paths in fluid communication with a plurality of paths established between adjacent plates.

16. The conditioner of claim 15 further including a source of fluid in communication with said input through path, wherein said heat exchanger is arranged such that fluid flows through said plurality of paths and interacts with a flow of fuel.

17. The conditioner of claim 16 wherein said fluid is one of air and oil.

18. The system of claim 9 wherein said surface is a top surface of said conditioner.

* * * * *